March 8, 1966 J. R. MADEIRA ET AL 3,239,285
IDLER ASSEMBLY
Filed Aug. 7, 1963 2 Sheets-Sheet 1
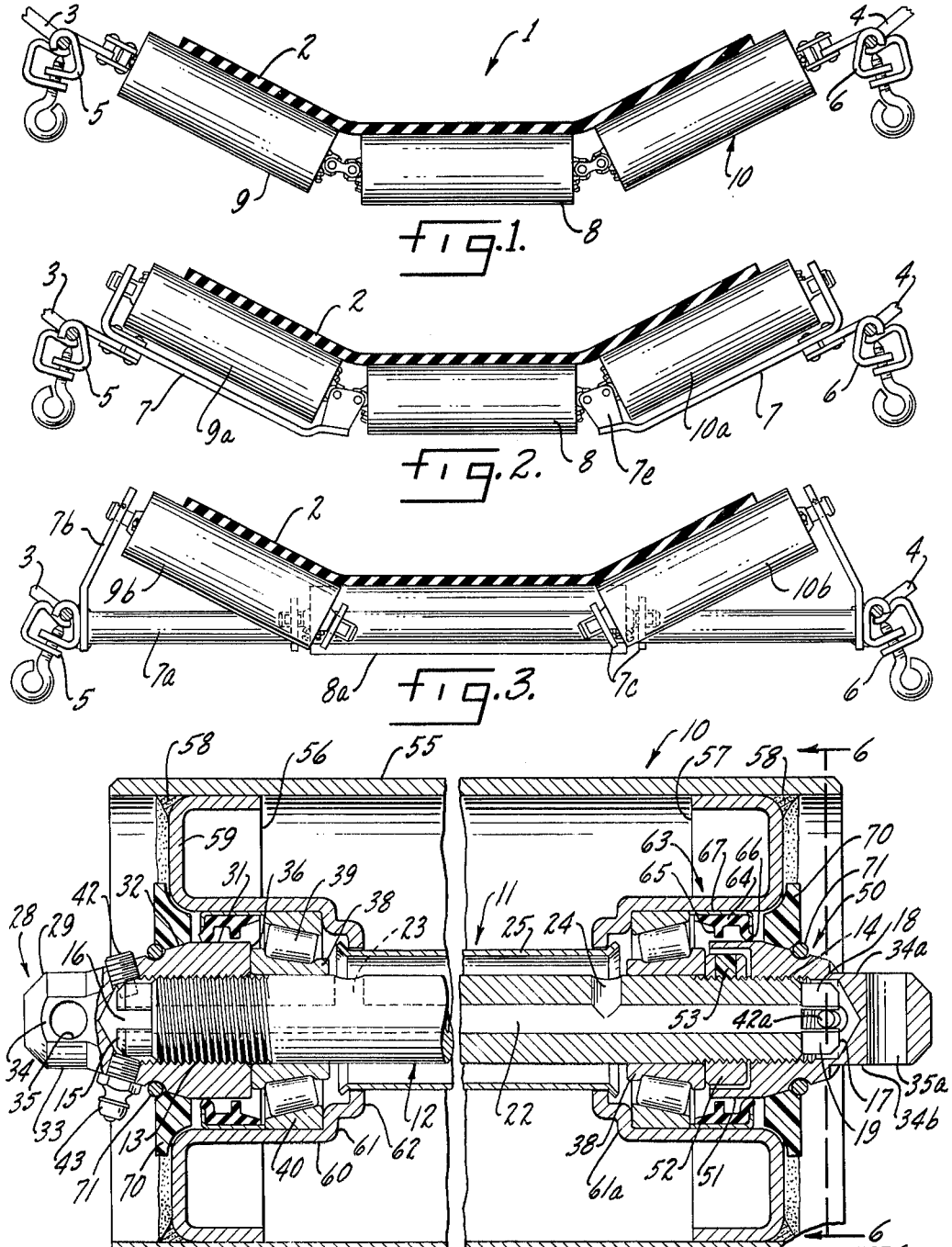
INVENTORS.
JOHN R. MADEIRA
DONALD C. REILLY
BY Parker & Carter
Attorneys.

March 8, 1966  J. R. MADEIRA ET AL  3,239,285
IDLER ASSEMBLY
Filed Aug. 7, 1963  2 Sheets-Sheet 2

INVENTORS.
JOHN R. MADEIRA
DONALD C. REILLY
BY Parker & Carter
Attorneys.

United States Patent Office
3,239,285
Patented Mar. 8, 1966

3,239,285
IDLER ASSEMBLY
John R. Madeira, Chicago, and Donald C. Reilly, Downers Grove, Ill., assignors to Goodman Manufacturing Company, Chicago, Ill., a corporation of Illinois
Filed Aug. 7, 1963, Ser. No. 297,084
7 Claims. (Cl. 308—20)

This invention relates to an idler roller for use in a conveyor idler assembly, and to a shaft assembly especially adapted for use therewith.

Wire rope sideframe conveyors of the type illustrated in the Craggs et al. Patent 2,773,257 have come into increasingly widespread use in recent years due to their many inherent advantages including lightness, ease of installation and removal, and high carrying capacity.

This invention relates to an idler roller, and an idler roller shaft assembly, which may be employed very advantageously in the general type of conveyor shown and described in the Craggs et al. patent. It should be clearly understood, however, that the invention is not so limited in application and it may, under appropriate circumstances, be used in other environments and with different types of conveyors, including rigid sideframe conveyors.

A primary object of the invention is to provide an idler roller having a minimum number of parts, most of them completely interchangeable, whereby a great variety of operatively different rollers can be fabricated from a minimum number of parts.

Another object is to provide an idler roller having a minimum number of parts adapted to fit a variety of installations by merely adjusting the angularity of certain parts with respect to one another.

A further object is to provide a shaft assembly especially adapted for use in an idler roller of the type discussed above which can be used in a cradle, semi-cradle, or sausage type idler roller assembly.

Yet another object is to provide an idler roller having mounting means at each end effective to mount the roller for limited or free-swinging movement in a vertical or horizontal plane, or for rigid attachment to associated supporting structure.

Yet another object is to provide an idler roller which is economical to produce, easy to assemble, and ideal to stock and ship from a manufacturer's standpoint since only five different shafts, such shafts differing only as to length, and one set of shaft and assemblies are needed to accommodate up to thirty different shaft arrangements.

Yet a further object is to provide a basic idler roller in which the mounting means for the shafts are separable from, but co-operable with, the shaft itself in differing combinations to thereby provide a maximum standardization of parts.

A further object is to provide an idler roller in which the length of the roller, and the position of the bearings with respect to each other and the roller shaft, may be quickly and easily adjusted to accommodate varying conditions in the field.

Yet another object is to provide an idler assembly in which both bearings may be lubricated easily from one end of the assembly.

Another object is to provide an idler roller having a unique labyrinth seal which isolates the bearing members from dust and dirt for maximum periods of time as contrasted to present units on the market.

Other objects and advantages of the invention will become apparent from the following description of the invention.

The invention is illustrated more or less diagrammatically in accompanying figures wherein:

FIGURE 1 is a cross-section through the conveying reach of a wire rope sideframe conveyor illustrating the invention as applied to a sausage type idler roller assembly;

FIGURE 2 is a similar cross-section showing the invention as applied to a semi-cradled idler roller assembly;

FIGURE 3 is a similar view through a rigid or fully-cradled type of idler assembly;

FIGURE 4 is a section through one of the wing rollers of the FIGURE 1 embodiment;

Like reference numerals will be used to refer to like parts throughout the following description of the drawings.

Figure 5:
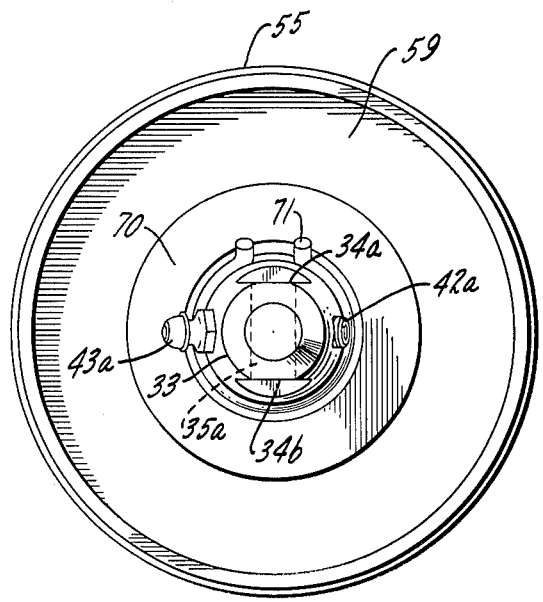
FIGURE 5 is an end view of the right end of the roller assembly of FIGURE 4.

Referring first to FIGURE 1, a sausage type troughing idler roller assembly is indicated generally at 1. The assembly includes a center roller 8 flanked by a pair of wing rollers 9 and 10. The rollers support the conveying reach 2 of a belt. The assembly is suspended from rope sideframes 3 and 4 by a pair of screw type hook connectors 5 and 6, one at each end of the assembly.

In FIGURE 2 the wing rollers 9a and 10a are connected to the sideframes and center roller 8 by shock absorbing cradle assemblies 7 which are more fully described in co-pending application Serial Number 80,869 assigned to the present assignee and to which reference is made for a complete description.

In FIGURE 3 the wing rollers 9b and 10b and center roller 8a are supported from a rigid cradle frame assembly which includes a tubular main frame member 7a and a plurality of supporting brackets 7b and 7c.

Figure 6:
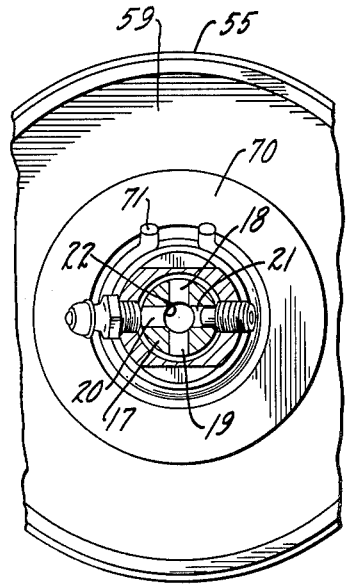
FIGURE 6 is a partial sectional view taken substantially along the line 6—6 of FIGURE 4.

Referring now to FIGURE 4, the idler assembly including the unique shaft assembly of the invention is indicated generally at 10. The shaft assembly 11 includes an elongated shaft 12 whose ends are threaded as at 13 and 14. The left end of the shaft terminates in a reduced diameter section 15 within which a plurality of apertures or slots 16 are formed. The right end of the shaft similarly terminates in a reduced diameter portion 17 within which a plurality of slots 18, 19, 20 and 21 are formed. As best seen in FIGURE 6 the apertures are most advantageously formed by a pair of longitudinal cuts, the individual apertures being located 90° with respect to one another. For reasons which will appear hereinafter it is desirable that the number of apertures be a multiple of 4.

A longitudinal internal center passage 22 extends the length of the shaft. A pair of passageways or outlets 23, 24 extend radially outwardly from the internal passage 22 to the surface of the shaft. In some instances it may be desirable to extend the internal passage 22 inwardly from each end only to the radial passages 23 and 24. A tubular reservoir casing is indicated at 25. Its ends are flared to form a tight seat against the edge of the aperture in the end walls. Since the casing is diametrically larger than the shaft 12 it forms in annular reservoir or lubricant chamber about the shaft 12.

A shaft mounting assembly is indicated generally at 28. The assembly includes a shaft nut 29 whose inner end is threaded for engagement with the threaded portion 13 on the shaft. The innermost portion of the shaft nut includes a uniform diameter section 31, tapering mid-portion 32, and finally an outermost portion 33 of uniform but reduced diameter as contrasted to the inner portion 31. A pair of flats 34 are milled on opposite sides of the reduced diameter portion 33 and a connecting aperture 35 is formed axially perpendicularly to the flats.

The innermost end surface 36 of shaft nut 29 forms an abutment surface for the inner race 38 of a roller bearing. The bearing includes a plurality of rollers 39 and an outer bearing race 40. Although tapered roller bearings have been illustrated, it will be at once apparent that under certain conditions different types of bearings, such as ball bearings, may be employed.

A pair of apertures are formed in the tapered portion 32 of the shaft nut. These apertures are spaced 180° from one another and lie in a plane which is perpendicular to the axis of aperture 35. A locking member 42 is received in one aperture and has an inner projecting portion which extends into a slot formed in the end of the shaft 22. A grease fitting 43 is threaded into the other aperture. Since the projecting portion of the locking member or set screw 42 projects into a slot in the shaft the grease fitting will open into an oppositely located slot since the slots are spaced 90° about the circumference of the shaft and the set screw and grease fitting apertures are 180° from each other about the shaft nut.

The shaft nut 50 at the right end of the shaft in FIGURE 4 has the same external configuration as the shaft nut 29 at the left end of the shaft. The inner end portion 51 of the nut consists essentially of an inwardly extending skirt within which an annular hollow area is formed between the shaft and the nut. An internally threaded adjusting nut 52 whose external diameter is smaller than the internal diameter of the skirt section 51 is threaded onto the shaft. Locking means 53, in this instance a deformable plastic material which can be forced against the threads to prevent unintended axial movement of the adjusting nut 52, maintains the adjusting nut in any desired position. Alternately a set screw or any other suitable means could be employed. In this instance the inner surface of the adjusting nut 52 provides the abutment surface against which the inner race 38 of the bearing is abutted. It should also be noted that in this instance the shaft nut is disposed 90° relative to the position of the shaft nut 29 at the left end of the shaft. That is, the flats 34a and 34b are perpendicular to the flats 34 on shaft nut 29 and of course aperture 35a is similarly disposed 90° with respect to aperture 35. Likewise the locking member 42a is disposed 90° with respect to locking member 42 at the left end of the assembly.

The idler roller itself consists of a shell or casing 55 to which end plates 56 and 57 are welded as at 58. Left end wall 56 includes an outer radial portion 59, a tubular, inwardly extending section 60, and an offset 61 which terminates in a radially inwardly directed lip 62. Right end wall 57 is similarly formed. The inner face of offset 61 forms an abutment against which outer bearing race 40 is nestled. This construction is duplicated at the right end of the shaft.

A labyrinth seal assembly is indicated at 63. The seal assembly includes an annular sealing member 64 having a radially inwardly extending flange or lip 65 which terminates short of contact with the exterior surface of inner portions 51 or 31 of the shaft nuts, and an outer, annular wiper lip 66 which contacts the exterior surface of said portions 51 and 31.

The seals are bonded or otherwise secured to an annular ring member 67 which in turn lies against the internal bore in section 60 of the end wall.

An annular end cap is indicated at 70. The end cap is formed of a deformable, preferably plastic, material and is so contoured as to have its inner surface complementary to the radially inwardly, tapering portion 32 of the shaft nut, and its outer surface spaced close to but out of contact with the bend formed between outer radial portion 59 and inwardly extending section 60 of the end wall. The tapering bore of the end cap is counter-sunk to form, in conjunction with a groove in tapering portion 32 of the shaft nut, a recess within which is received a snap ring 71. The snap ring forms an abutment which prevents further longitudinally outward movement of the end cap 70.

The use and operation of the invention are as follows:

A roller bearing, in this instance left bearing 38, 39, 40, is assembled on the left end of roller shaft 12. Shaft nut 29 is then turned on the threaded portion 13 of the shaft a desired distance. Once in place it will be in abutting engagement with the inner race 38 of the roller bearing, and functions as a bearing retainer. This shaft assembly is then inserted into a roller shell which consists of the outer casing 55, end walls 56, 57 and interior reservoir casing 25. The shaft assembly is inserted until the outer bearing race 40 strikes offset portion 61 of the end wall.

The right roller bearing is then placed on the opposite end of the shaft and seated against the offset portion 61a of the right end wall. The adjusting nut 52 is then turned on the threaded portion 14 of the shaft and down into engagement with the inner race of the bearing. The extent to which the nut is turned on the shaft will determine the degree of bearing adjustment, but in any event, once in place it functions as a bearing adjustment member whereby any desired pressure or seating force can be applied to the bearing. Once the proper degree of bearing adjustment is achieved, locking means 53 maintains the parts in their position as shown in FIGURE 4. Shaft nut 51 is then turned on to the threaded portion 14 of the shaft until its inner skirt overlies the adjusting nut 52 and the flats 34a and 34b are properly positioned with respect to the flats on left shaft nut 29. Once in place, member 52 functions as a connector for securing the assembly to adjacent structure, such as another, similar assembly. If the roller is being assembled as a right wing roller in a sausage idler assembly of the type illustrated in FIGURE 1, flats 34a and 34b will be perpendicular to flats 34.

Thereafter, working at the other or left end of the assembly, locking set screw 42 is threaded into the left shaft nut until its inner end projects into one of the series of slots which have been formed on the end of the shaft.

After the shaft nuts have been placed on the end of the shaft, and preferably before the grease fittings 43 are installed, the seal assemblies are installed at each end of the roller. The wiper seal 64 is first installed and then the end caps 70 are placed in the illustrated position. Finally the snap rings 71 are dropped into place so as to maintain the end caps in position. The end caps remain stationary since they are carried by the shaft assembly whereas the wiper seal rotates with the roller casing 55 since it is secured thereto either by friction or other suitable securing means.

The wiper seals in combination with the end caps provide a labyrinth grease seal which experience has shown effectively insulates the bearings and the balance of the shaft assembly from the dust and dirt.

In the final assembly operation the grease fittings 43 are installed. At least one grease fitting is employed. Two must be used if there is no communication between ends of the shaft assembly. In the FIGURE 4 embodiment, inner passage 22 extends the length of the shaft so that grease admitted at one end will travel to the other end. The reservoir tube 25 forms an annular reservoir about the shaft in addition to the storage space provided by the passage 22 so that as lubricant is lost between the end cap and end walls a further supply is provided to replenish that loss.

Since the slots 16–21 are located 90° with respect to one another, or at least at an angle which is a multiple of 4, the grease fitting 43 when installed will be aligned with another slot in the series of slots since the apertures for the set screw and grease fittings are 180° apart. For convenience the tapped holes for the set screw and the grease fitting are the same thread dimension and, as mentioned, are spaced diametrically opposite one another.

All of the slots formed in the ends of the shaft lead to the center grease passage or conduit 22 which extends the length of the shaft. The provision of communication between the ends of the shaft enables the entire assembly to be greased from only one end if desired. It should be understood however that center aperture 22 could extend only to radical apertures 23, 24 which open into the grease reservoir on the inner side of the bearing races. In this event, and assuming communication between the ends of the shaft is blocked as by the elimination of reservoir tube 25 and the provision of a greasetight seal between the shaft and end walls, the bearings would be lubricated from each end.

One of the great advantages of the present construction is that the roller can be lubricated in the field from one or both ends, at the option of the user, but in either event the grease fittings are located at the most readily accessible positions for fast and easy lubrication. That is, the grease fittings may be so located that no matter what mode of connection is used, and no matter whether an overlying belt is or is not present, the grease fitting will be at the location most remote from the obstructed areas. In FIGURE 1, for example, the belt prevents easy access to the upper side of the left end of the shaft of right wing roller 10 and the chain link prevents location at the side. The grease fitting is therefore easily inserted at the bottom. The chain link connector at the right end of the shaft precludes easy top or bottom access, and accordingly a side location is used. In FIGURE 2, the frame 7 and left upstanding connecting plates 7e preclude easy access to the sides and bottom of the left end of the shaft of right wing roller 10a. Accordingly, the fitting is located at the top of the shaft. In each instance no modification of the shaft end assemblies is required so far as placement of the fitting is concerned. The proper positioning is easily accomplished by a mere adjustment of position of the shaft nuts.

As soon as shaft nut 50 has been turned to the position shown in FIGURE 4, which it will be noted is identical to the position of the shaft nut at the outer end of the right wing roller in FIGURE 1, set screw 42a and a grease fitting are then turned into the diametrically opposite tapped holes in the nut.

It will be noted that the shaft nut 50 is not turned down tight against adjusting nut 52. Rather it is positioned relative to the first shaft nut so that the mounting means will be in a proper location for assembly. That is, if the roller is intended to be employed as a center roller in a three roller sausage type idler roller assembly as in FIGURE 1, the right shaft nut 50 would be turned until its milled flats 34a and 34b lie in the same plane as the milled flat 34 shown at the left of the assembly.

In operation, the idlers are hooked into their appropriate assemblies, either the sausage type of FIGURE 1, the semi-cradled shock link type of FIGURE 2, or the fully cradled type of FIGURE 3. Each individual roller is then lubricated either at the factory or upon arrival at the job site. Once installed, it is only necessary for the assemblies to be periodically re-greased by attaching a grease gun to a grease fitting at one end and then forcing grease in until it is seen to ooze past the seals 70 at the ends. As soon as oozing is observed the operator knows that the interior of the roller is completely filled with lubricant. Alternately, the rollers may be greased from both ends, the choice being with the operator in the field.

It can be seen that adjustment of the roller bearings is not dependent upon both shaft nuts. One, the right end nut, is left free to rotate so that it may be positioned relative to the other shaft nut which enables the mounting means and the grease fittings to be placed in their appropriate location for installation in an idler assembly.

It should also be noted that although slots have been shown in the end of the shaft, it is not absolutely essential that only open-ended slots be used.

Although a preferred embodiment of the invention has been illustrated and described and its use in at least three different applications has been explained it will at once be apparent to those skilled in the art that various modifications and changes may be made without departing from the essential spirit and scope of the invention. Accordingly it is the intention that the scope of the invention be limited not by the above exemplary description but only the scope of the hereafter appended claims.

We claim:

1. In combination in a roller shell assembly having an end wall at each end thereof, bearing receiving means associated with each end wall, and a bearing received in each bearing receiving means, the improvement comprising shaft means, a bearing retainer member received on one end portion of the shaft means, said bearing retainer member being in direct abutting engagement with the bearing on said one end portion of the shaft means to thereby urge the bearing into a seated position with respect to the one end wall, said bearing retainer being connectable, at its outwardly projecting end, to adjacent structure, first locking means for fixing the bearing retainer member against longitudinal movement with respect to the shaft means, a bearing adjustment member received on the other end portion of the shaft means, said bearing adjustment member being in direct abutting engagement with the bearing on said other end portion of the shaft means to thereby force the bearing into a seated position with respect to the other end wall, said adjustment member including deformable locking structure for securing the adjustment member to the shaft means in any desired relation thereto to thereby exert any desired seating force on the bearings, a connector received on the other end of the shaft means for connection to adjacent structure, second locking means for fixing the connector against longitudinal movement with respect to the shaft, said connector being positionable at a plurality of longitudinal positions along the shaft means with respect to the adjustment member, a lubricant passageway at each end of the shaft means which provides a lubricant flow path spanning the bearing at each end thereof, and exteriorly located lubricant admission means at each end of the shaft means, each lubricant admission means communicating with the lubricant passageway flanking the associated bearing.

2. The assembly of claim 1 further including a labyrinth seal at each end portion of the shaft means, each labyrinth seal being located outwardly from its associated bearing, the labyrinth seal at the said one end portion of the shaft means being located between the associated bearing and its associated lubricant admission means, and interposed between the one end wall and the bearing retainer member, the labyrinth seal at the said other end portion of the shaft means being located between the associated bearing and its associated lubricant admission means, and interposed between the other end wall and the connector.

3. The assembly of claim 1 further characterized in that the first and second locking means comprises a plurality of openings formed in each outer end portion of the shaft means, and a pair of locking members, one carried by the bearing retainer member and another by the connector, respectively, which extends into engagement with any desired one of said openings, at least one of said blocking members being exteriorly accessible.

4. The assembly of claim 3 further characterized in that the number of openings in each outer end portion of the shaft means is a multiple of four.

5. The assembly of claim 1 further characterized
firstly, in that each lubricant admission means includes a lubricant fitting which extends through either the bearing retainer member or the connector, and
secondly, in that the openings in each end portion of the shaft means are so arranged that a lubricant fitting discharges into an opening whenever an associated locking member is in engagement therewith.

6. The assembly of claim 1 further characterized in that the bearing retainer member and the connector are identically exteriorly contoured.

7. The assembly of claim 2 further including
a shield assembly carried by each of the bearing retainer member and the connector,
each of said shield assemblies extending outwardly to a point at which it forms a narrow lubricant flow path with the associated end wall,
each of said shield assemblies being located longitudinally outwardly past its adjacent labyrinth seal.

References Cited by the Examiner
UNITED STATES PATENTS

| | | | |
|---|---|---|---|
| 314,901 | 3/1885 | Winchell | 308—22 |
| 454,019 | 6/1891 | Bassett | 301—114 |
| 1,742,453 | 1/1930 | Van Derhoef | 308—20 X |
| 1,772,685 | 8/1930 | Pollak | 308—207 |
| 2,858,176 | 10/1958 | Thompson | 308—187.1 |
| 3,070,219 | 12/1962 | Donadio | 198—192 |

FOREIGN PATENTS 554,976 3/1958 Canada.

DAVID J. WILLIAMOWSKY, *Primary Examiner.*

FRANK SUSKO, *Examiner.*

L. L. JOHNSON, *Assistant Examiner.*